No. 759,387.

Patented May 10, 1904.

UNITED STATES PATENT OFFICE.

MARIUS MAGNARD, OF SALAISE, FRANCE.

REISSUED

PROCESS OF MAKING PYROTECHNICAL COMPOSITIONS.

SPECIFICATION forming part of Letters Patent No. 759,387, dated May 10, 1904.

Application filed January 12, 1904. Serial No. 188,769. (No specimens.)

*To all whom it may concern:*

Be it known that I, MARIUS MAGNARD, a citizen of the French Republic, residing at Salaise, Department of the Isère, France, have invented a certain new or Improved Pyrotechnical Composition, of which the following is a specification.

This invention relates to a new or improved pyrotechnical composition suitable for the manufacture of detonating fireworks and for other pyrotechnical purposes.

This composition is manufactured in the following manner: In five liters of water are mixed five kilograms of gum-arabic and 1.5 kilograms of carbonate of magnesium. This mixture is then heated to 50° centigrade, and one kilogram of white phosphorus is then added. The mixture is then allowed to cool to 25° under continuous stirring in order to obtain a very intimate mixture, after which 2.5 kilograms of red ocher and three kilograms of chlorate of potash are added. The product is reduced to powder and used for the manufacture of pyrotechnical articles of all kinds.

I declare that what I claim is—

1. A process for the production of a pyrotechnical compound consisting in mixing gum-arabic and carbonate of magnesium in water, heating the mixture, adding white phosphorus, allowing this mixture to cool under continuous agitation, adding red ocher and chlorate of potash and finally reducing the product to powder substantially as described.

2. A process for the production of a pyrotechnical compound consisting in mixing five kilograms gum-arabic and five kilograms carbonate of magnesium in five liters water, heating the mixture to 50° centigrade, adding one kilogram white phosphorus thereto, allowing this mixture to cool to 25° centigrade under continuous agitation, adding 2.5 kilograms red ocher and three kilograms chlorate of potash and finally reducing the product to powder substantially as described.

In witness whereof I have signed this specification in the presence of two witnesses.

MARIUS MAGNARD.

Witnesses:
 JEAN GERMAIN,
 MARIN VUCHON.